(12) United States Patent
Abe et al.

(10) Patent No.: US 11,033,975 B2
(45) Date of Patent: Jun. 15, 2021

(54) WIRE ELECTRICAL DISCHARGE MACHINE AND MACHINING CONDITION ADJUSTMENT METHOD

(71) Applicant: FANUC CORPORATION, Yamanashi (JP)

(72) Inventors: Hiroyuki Abe, Yamanashi-ken (JP); Hiroyuki Furukawa, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 134 days.

(21) Appl. No.: 16/438,752

(22) Filed: Jun. 12, 2019

(65) Prior Publication Data
US 2019/0381589 A1    Dec. 19, 2019

(30) Foreign Application Priority Data
Jun. 15, 2018 (JP) .............................. JP2018-114315

(51) Int. Cl.
*B23H 11/00* (2006.01)
*B23H 7/10* (2006.01)
(Continued)

(52) U.S. Cl.
CPC ............. *B23H 11/00* (2013.01); *B23H 7/065* (2013.01); *B23H 7/10* (2013.01); *B23H 7/105* (2013.01);
(Continued)

(58) Field of Classification Search
CPC . B32H 7/10; B32H 7/14; B23H 11/00; B23H 7/065; B23H 7/105; B23H 7/32;
(Continued)

(56) References Cited

U.S. PATENT DOCUMENTS 5,019,684 A * 5/1991 Ito .......................... B23H 7/10
219/69.12
2013/0024020 A1 * 1/2013 Onodera ................ B23H 7/102
700/159

FOREIGN PATENT DOCUMENTS

EP         2589453 A2      5/2013
JP         01240220 A  *   9/1989
JP         1310822 A      12/1989

OTHER PUBLICATIONS

Cabanes et al: "An industrial application for on-line detection of instability and wire breakage in wire EDM", Journal of Materials Processing Technology, vol. 195, No. 1, Jan. 1, 2008, pp. 101-109.
(Continued)

*Primary Examiner* — Geoffrey S Evans
(74) *Attorney, Agent, or Firm* — Fredrikson & Byron, P.A.

(57) ABSTRACT

A wire electrical discharge machine for performing electrical discharge machining on a workpiece to be machined by applying voltage to an electrode gap formed between a wire electrode and the workpiece to generate electrical discharge at the electrode gap under predetermined machining conditions while conveying the wire electrode along a transfer path, includes: a wire breakage detector for detecting a breakage of the wire electrode; a position calculator for calculating the breakage position of the wire electrode in the transfer path; and an adjustment unit for adjusting the machining conditions when the breakage position is in a predetermined section of the transfer path.

10 Claims, 3 Drawing Sheets

(51) Int. Cl.
  *B23H 7/06* (2006.01)
  *B23H 7/14* (2006.01)
  *B23H 7/32* (2006.01)
  *B23H 7/20* (2006.01)
(52) U.S. Cl.
  CPC ................ *B23H 7/14* (2013.01); *B23H 7/20* (2013.01); *B23H 7/32* (2013.01); *B23H 2500/20* (2013.01); *B23H 2600/10* (2013.01)
(58) Field of Classification Search
  CPC .. B23H 2500/20; B23H 2600/10; B23H 7/10; B23H 7/20
  See application file for complete search history.

(56) References Cited

OTHER PUBLICATIONS

European Application No. 19179919.6, Extended European Search Report dated Nov. 15, 2019, 7 pages.
English Machine Translation for Japanese Publication No. 1-310822 A, published Dec. 14, 1989, 3 pages.

\* cited by examiner

WIRE ELECTRICAL DISCHARGE MACHINE AND MACHINING CONDITION ADJUSTMENT METHOD

CROSS-REFERENCE TO RELATED APPLICATION

This application is based upon and claims the benefit of priority from Japanese Patent Application No. 2018-114315 filed on Jun. 15, 2018, the contents of which are incorporated herein by reference.

BACKGROUND OF THE INVENTION

Field of the Invention

The present invention relates to a wire electrical discharge machine that performs electrical discharge machining on a workpiece to be machined under adjusted machining conditions, as well as relating to a method of adjusting the machining conditions.

Description of the Related Art

In the field of machining using a wire electrical discharge machine, there is known a technique for suppressing the occurrence of wire breakage by changing the machining conditions when the number of breakages of the wire electrode exceeds a predetermined number (for example, Japanese Laid-Open Patent Publication No. 01-310822).

SUMMARY OF THE INVENTION

There are various causes of breakage of the wire electrode. However, there are cases where adjustment of machining conditions is not needed such as wear of parts and temporary disturbance of the wire traveling system. If unnecessary adjustments of machining conditions are performed, the production efficiency may decrease instead due to lowering in machining speed and the like.

It is therefore an object of the present invention to provide a wire electrical discharge machine and a method of adjusting machining conditions, which can prevent a decrease in efficiency due to the unnecessary adjustments of machining conditions.

According to a first aspect of the present invention, a wire electrical discharge machine for performing electrical discharge machining on a workpiece to be machined by applying voltage to an electrode gap formed between a wire electrode and the workpiece to generate electrical discharge at the electrode gap under a predetermined machining condition while conveying the wire electrode along a transfer path, includes: a wire breakage detector configured to detect a breakage of the wire electrode; a position calculator configured to calculate the breakage position of the wire electrode in the transfer path; and an adjustment unit configured to adjust the machining condition when the breakage position is in a predetermined section of the transfer path.

According to a second aspect of the present invention, a machining condition adjustment method for use in a wire electrical discharge machine that performs electrical discharge machining on a workpiece to be machined by applying voltage to an electrode gap formed between a wire electrode and the workpiece to generate electrical discharge at the electrode gap under a predetermined machining condition while conveying the wire electrode along a transfer path, comprises: a wire breakage detection step of detecting a breakage of the wire electrode; a position calculation step of calculating the breakage position of the wire electrode in the transfer path; and an adjustment step of adjusting the machining condition when the breakage position is in a predetermined section of the transfer path.

According to the present invention, it is possible to prevent a decrease in efficiency due to the unnecessary adjustment of the machining conditions.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The wire electrical discharge machine and the machining condition adjustment method according to the present invention will be detailed below by describing a preferred embodiment with reference to the accompanying drawings.

Embodiment

Figure 1:
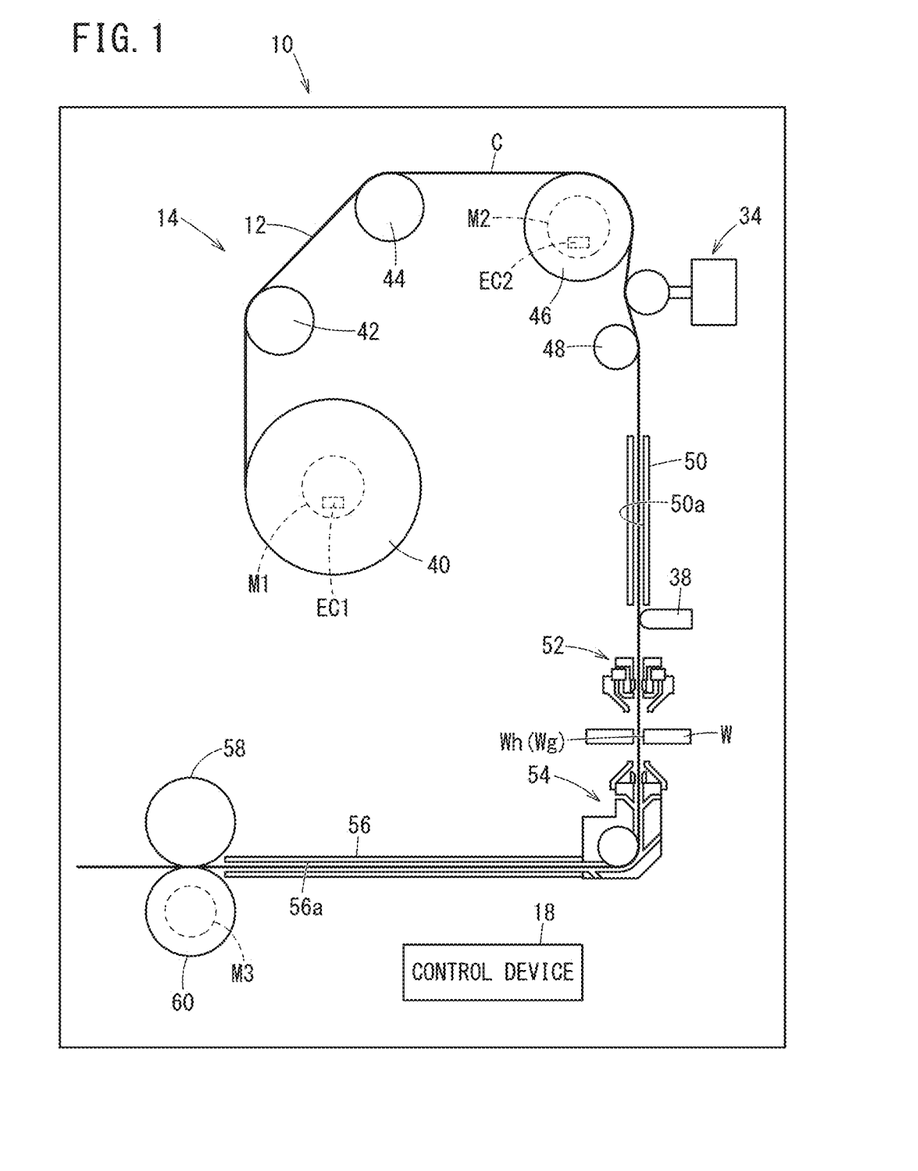
FIG. 1 is a schematic view showing a configuration of a wire electrical discharge machine according to the present embodiment.

FIG. 1 is a view schematically showing a configuration of a wire electrical discharge machine 10 according to the present embodiment. The wire electrical discharge machine 10 is a machine tool that performs machining (also referred to as electrical discharge machining) on a workpiece W by applying voltage to a gap (also referred to as an electrode gap) formed between a wire electrode 12 and the workpiece W to generate electrical discharge.

The wire electrode 12 is made from, for example, tungsten-based, copper alloy-based, brass-based metal or the like. The workpiece W is made from, for example, metal materials such as iron-based material or superhard material. Here, the workpiece W is supported by an unillustrated table that can move along a plane intersecting the wire electrode 12. The table is moved by unillustrated motors driven by a control device 18.

The wire electrical discharge machine 10 includes a transport mechanism 14 (transport device) that transports the wire electrode 12 along a predetermined transfer path C. The wire electrical discharge machine 10 further includes a tension detector (breakage detector) 34 for detecting the tension of the wire electrode 12, a tip detection electrode 38 for detecting the tip of the wire electrode 12, and the control device 18 for controlling the operation of the entire wire electrical discharge machine 10.

The transport mechanism 14 includes, in the following order from the upstream to the downstream in the transfer path C: a wire bobbin 40; guide rollers 42 and 44; a brake roller 46; a guide roller 48; an upper pipe 50; an upper wire guide (upper wire guide unit) 52; a lower wire guide (lower wire guide unit) 54; a lower pipe 56; a pinch roller 58; a feed roller 60 and the like.

The transport mechanism 14 automatically performs wire feeding and conveys the wire electrode 12 along the transfer path C under the control of the control device 18 when the wire electrode 12 is broken or other cases. The wire feeding is a process whereby the wire electrode 12 wound on the wire bobbin 40 is fed along the transfer path C, passed through the upper wire guide 52, the workpiece W to be machined, the lower wire guide 54 and others, and held between the pinch roller 58 and the feed roller 60. When the wire electrode 12 is fed, a predetermined tension is applied to the wire electrode 12.

The transport mechanism 14 also conveys the wire electrode 12 after wire connection along the transfer path C, for example, during electrical discharge machining. Now, each component included in the wire electrical discharge machine 10 will be described along the transfer path C.

The long wire electrode 12 is wound on the wire bobbin 40, and supplied from the wire bobbin 40, then stretched around the guide rollers 42 and 44, the brake roller 46, and the guide roller 48, to be sent to the upper pipe 50. The wire electrode 12 sent to the upper pipe 50 passes through the inside of an insertion hole 50a of the upper pipe 50 to proceed downstream (downward), and is sent to the upper wire guide 52. Then, the wire electrode 12, sent to the upper wire guide 52, passes through a machining start hole Wh or a machining groove Wg of the workpiece W placed between the upper wire guide 52 and the lower wire guide 54, and further sent downstream (downward) toward lower wire guide 54. The wire electrode 12 reaching the lower wire guide 54 passes through the inside of an insertion hole 56a of the lower pipe 56, and is then collected by the pinch roller 58 and the feed roller 60 which hold the wire electrode 12 therebetween.

The wire bobbin 40 is turned by the torque given from a motor M1 having an encoder EC1. The motor M1 is driven under the control of the control device 18. When the wire electrode 12 is broken, the motor M1 rotates the wire bobbin 40 under the control of the control device 18 to rewind the wire electrode 12. The encoder EC1 measures the rotary position of the motor M1.

The guide rollers 42 and 44 deflect the transfer direction of the wire electrode 12 delivered from the wire bobbin 40 and guide the wire electrode 12 toward the brake roller 46.

The brake roller 46 is turned by the torque given from a motor M2 having an encoder EC2. The motor M2 is driven under the control of the control device 18. A braking force can be applied to the wire electrode 12 by changing the torque applied to the brake roller 46. The brake roller 46 changes the transfer direction of the transported wire electrode 12. The brake roller 46 in this embodiment feeds and deflects downward the wire electrode 12 being conveyed in a predetermined direction. The brake roller 46 applies a braking force caused by friction to the wire electrode 12 to move the wire electrode 12 without causing a slippage. As a result, the wire electrical discharge machine 10 can accurately recognize the delivered amount of the wire electrode 12 based on the amount of rotation of the brake roller 46.

When the wire electrode 12 is broken, the motor M2 rotates the wire bobbin 40 under the control of the control device 18 to rewind the wire electrode 12. The encoder EC2 measures the rotary position of the motor M2.

The tension detector 34 is a sensor that is arranged in the transfer path C between the brake roller 46 and the guide roller 48 to detect the tension of the wire electrode 12. The tension detector 34 can also provide a function as a wire breakage detector for detecting a breakage of the wire electrode 12 because a break of the wire electrode 12 can be known by detecting the change of the tension of the wire electrode 12. Hereinafter, the tension detector 34 is also referred to as a wire breakage detector.

The guide roller 48 guides the wire electrode 12 sent out from the brake roller 46 to the insertion hole 50a of the upper pipe 50.

The tip detection electrode 38 is provided between the upper pipe 50 and the upper wire guide 52 in the transfer path C.

The tip detection electrode 38 detects the leading end of the wire electrode 12 formed due to its breakage. The tip detection electrode 38 moves into contact with the wire electrode 12 under the control of the control device 18 when the tension detector 34 detects a breakage of the wire electrode 12. The tip detection electrode 38 in the present embodiment is movable in a direction perpendicular to the transfer direction of the wire electrode 12, is located at a retracted position away from the transfer path C during electrical discharge machining, and moves to a position where the tip detection electrode 38 touches or crosses the transfer path C. Thereby, the tip detection electrode 38 contacts the wire electrode 12 when the wire electrode 12 exists at the position where the electrode 38 has moved.

The tip detection electrode 38 is connected to a voltage sensor and a power supply unit (not shown). If the tip detection electrode 38 is not in contact with the wire electrode 12, the voltage of the tip detection electrode 38 remains equal to the voltage of the power supply, and if the tip detection electrode 38 touches the wire electrode 12, a current flows between the tip detection electrode 38 and the wire electrode 12, and the voltage of the tip detection electrode 38 becomes a value different from the voltage of the power supply unit. Thereby, it is possible to detect the touch of the wire electrode 12 to the tip detection electrode 38. Thus, while the wire electrode 12 is broken if the tip detection electrode 38 moves toward the transfer path C and comes into contact with the wire electrode 12 and then the wire electrode 12 is rewound, the position of the tip of the wire electrode 12 can be recognized when the tip detection electrode 38 moves away from the wire electrode 12.

The upper pipe 50 is arranged downstream of the guide roller 48 in the transfer path C, and formed with the insertion hole 50a that allows the wire electrode 12 to pass therethrough. As the wire electrode 12 is inserted into the insertion hole 50a, the upper pipe 50 guides the wire electrode 12 downstream along the transfer path C.

The upper wire guide 52 is arranged in the transfer path C on the downstream side of the tip detection electrode 38 and on the upstream side of the workpiece W so as to transport and support the wire electrode 12. The lower wire guide 54 is arranged in the transfer path C on the downstream side of the workpiece W so as to transport and support the wire electrode 12 as the upper wire guide 52 does.

The lower pipe 56 is provided downstream of the lower wire guide 54 in the transfer path C, and formed with the insertion hole 56a that allows the wire electrode 12 to pass therethrough. The lower pipe 56 in this embodiment horizontally sends out the wire electrode 12 from the lower wire guide 54 to the pinch roller 58 and the feed roller 60.

The pinch roller 58 and the feed roller 60 are arranged in the transfer path C downstream of, and at the side of, the lower pipe 56. The pinch roller 58 and the feed roller 60 hold the used wire electrode 12 therebetween and pull the used wire electrode 12 in the transport direction on the transfer path C. The pulled wire electrode 12 is collected by an unillustrated collection unit. The feed roller 60 is turned by the torque given by a motor M3 driven under the control of the control device 18.

Figure 2:
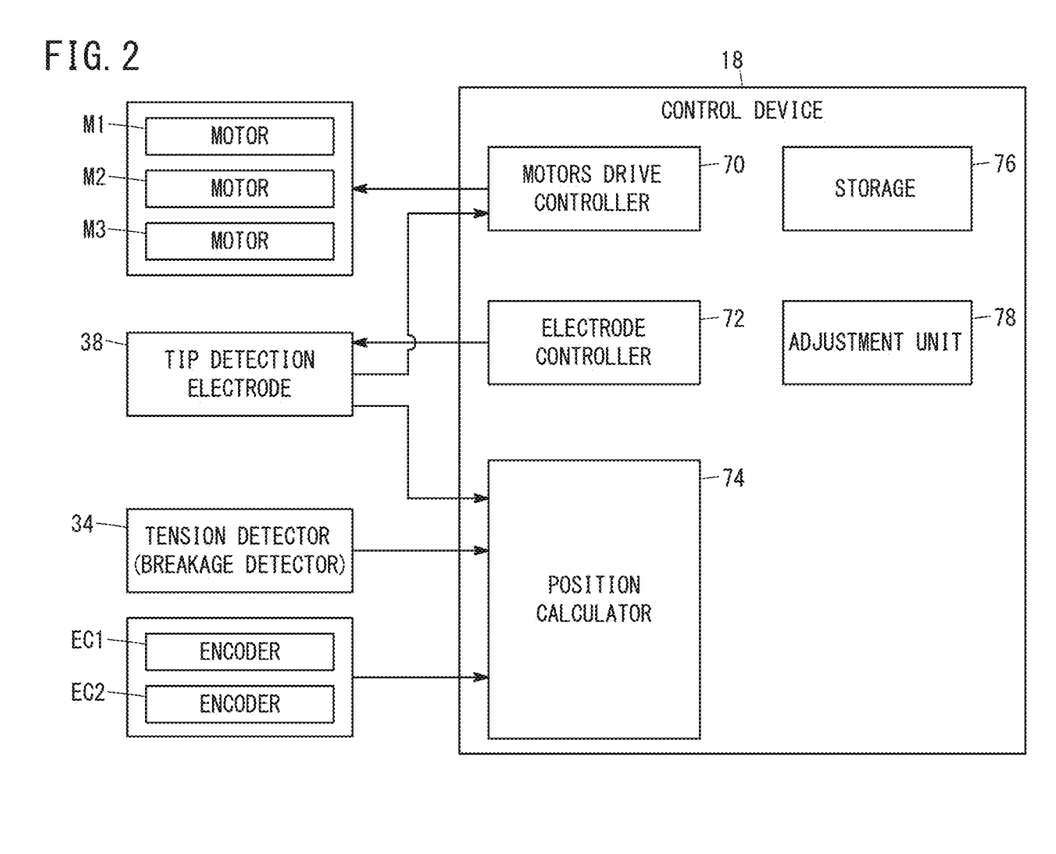
FIG. 2 is a diagram showing an example of functional blocks of a control device in the present embodiment.

FIG. 2 is a diagram showing an example of functional blocks of the control device 18 in the present embodiment. The control device 18 includes a motors drive controller 70, an electrode controller 72, a position calculator 74, a storage 76, an adjustment unit 78 and others. The control device 18 can be configured of, for example, a processor such as a central processing unit (CPU), a memory such as a read only memory (ROM) or a random access memory (RAM), various interfaces and the like. The memory implements the function of the storage 76. The processor functions as the position calculator 74 by executing processing using information acquired via the interfaces, a program stored in the memory and various information. The processor executes processing using programs and various information stored in the memory and provides the functions of the motors drive controller 70, the electrode controller 72, and the adjustment unit 78 through the interfaces.

During the machining, the motors drive controller 70 drives the motors M1 to M3 so as to feed the wire electrode 12 along the transfer path C with a constant tension applied to the wire electrode. Additionally, at the time of breakage of the wire electrode 12 during machining, the motors drive controller 70 drives the motors M1 to M3 so as to rewind in the direction opposite to the transfer direction the wire electrode 12 that lies upstream of the position (also referred to as the breakpoint) where the wire electrode 12 is cut in the transfer path C, and conveys the wire electrode 12 that lies downstream of the breakpoint in the transfer direction.

The electrode controller 72 controls the operation of the tip detection electrode 38, and moves the tip detection electrode 38 to a position where the tip detection electrode 38 can touch the wire electrode 12 when the tension detector 34 detects a breakage of the wire electrode 12.

When the tension detector 34 detects a breakage of the wire electrode 12 and the tip detection electrode 38 detects the wire electrode 12, the position calculator 74 collects pulses from at least one of the encoder EC1 and the encoder EC2, from the start of rewinding of the wire electrode 12 up to the moment at which the tip of the wire electrode 12 is detected. The pulses are output from the encoder EC1 or EC2 every time the motor M1 or the motor M2 makes a certain amount of change in rotary position. The position calculator 74 counts the pulses.

The position calculator 74 calculates the amount of rewinding of the wire electrode 12 based on the number of pulses acquired from at least one of the encoder EC1 and the encoder EC2. The position calculator 74 derives the breakage position of the wire electrode 12 from the amount of rewinding of the wire electrode 12. The breakage position is located downstream from the tip detection electrode 38 along the transfer path C by the rewound amount of the wire electrode 12. Therefore, by calculating the rewound amount of the wire electrode 12, the breakage position along the transfer path C starting from the tip detection electrode 38 is calculated.

The storage 76 stores machining conditions. The machining conditions are the machining conditions under which electrical discharge machining is performed, and include at least one of the voltage pulse pause time, the servo voltage and the feed rate of the workpiece W. The voltage pulse pause time refers to a period from the end of the application of voltage to the electrode gap to the next application of voltage. The servo voltage refers to a reference voltage for advancing the wire electrode 12 so as to keep the discharge interval constant during machining. The discharge interval refers to a time interval from the application of a voltage pulse to the start of discharge. The feed rate of the workpiece W indicates the moving speed of the workpiece W on the plane intersecting the wire electrode 12, toward the wire electrode 12. The storage 76 also stores the range of a predetermined section on the transfer path C. The predetermined section refers to, for example, a section between the upper wire guide 52 and the lower wire guide 54.

The adjustment unit 78 sets up the predetermined machining conditions stored in the storage 76 for electrical discharge machining. When a wire breakage takes place during the execution of electrical discharge machining under the predetermined machining conditions and when the breakage occurs within the predetermined section, it is deduced that the breakage is attributed to the machining conditions. The adjustment unit 78 therefore changes the machining conditions. Since a breakage occurring due to the machining conditions is considered to be caused by the fact that the discharge energy is too high, the adjustment unit 78 changes the machining conditions so as to lower the discharge energy generated. Specifically, the adjustment unit 78 controls the power supply unit (not shown) that applies voltage across the electrode gap, and performs, at least, one of the action of extending the voltage pulse pause time, the action of raising the servo voltage, and the action of lowering the feed rate of the workpiece W, as compared to those when no wire breakage is detected.

The adjustment unit 78 will not make any change to the machining conditions as above when no wire breakage occurs during execution of electrical discharge machining under the predetermined machining conditions, and even when a wire breakage has occurred outside than the predetermined section.

Figure 3:
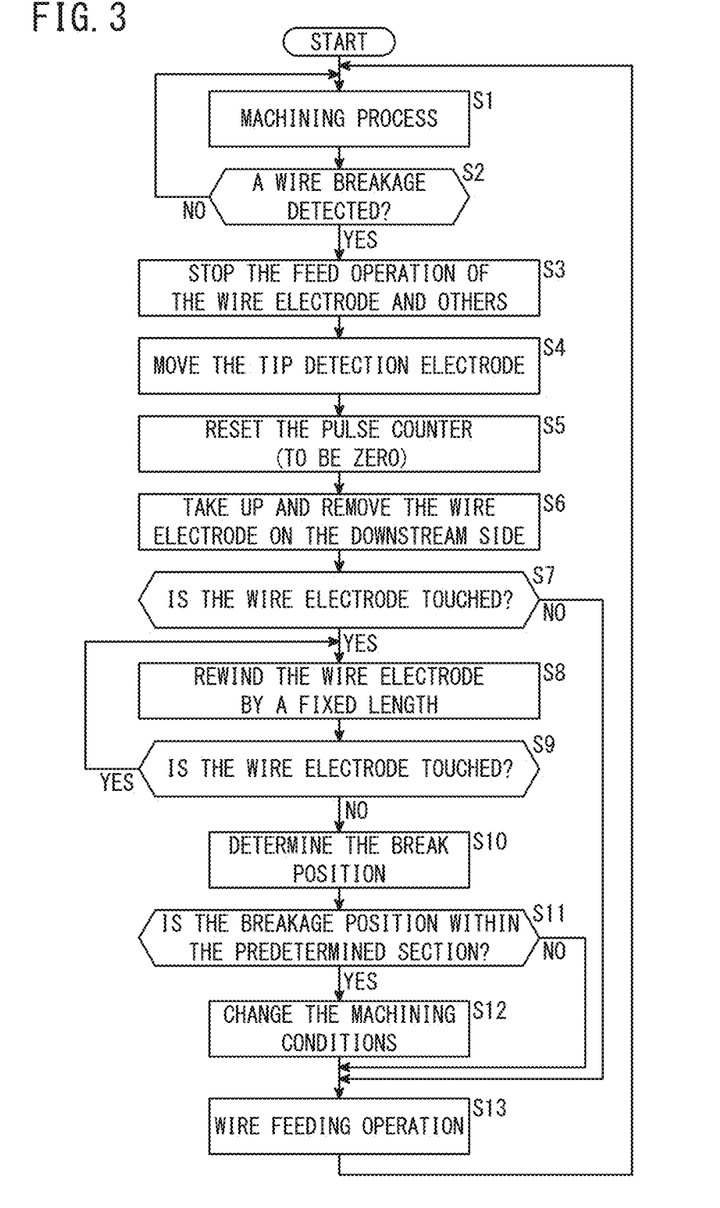
FIG. 3 is a flowchart showing an example of processing by the wire electrical discharge machine according to the present embodiment.

FIG. 3 is a flowchart showing an example of processing by the wire electrical discharge machine 10 according to the present embodiment. When the tension detector (breakage detector) 34 detects a breakage of the wire electrode 12 while the wire electrical discharge machine 10 is performing an electrical discharge machining process in step S1 under predetermined machining conditions (step S2: YES), the control of the wire electrical discharge machine 10 proceeds to step S3. When the tension detector 34 does not detect any breakage of the wire electrode 12 (step S2: NO), the wire electrical discharge machine 10 continues the current machining process (step S1).

At step S3, the wire electrical discharge machine 10 stops the machining process. At this time, the motors drive controller 70 controls and stops the motors M1 to M3 operating so as to stop the delivery of the wire electrode 12 in the transfer direction and other operations.

Next to step S3, the electrode controller 72 controls and moves the tip detection electrode 38 to a position where the tip detection electrode 38 can contact the wire electrode 12 (step S4). At step S5, the position calculator 74 resets the counter to zero that counts the pulses from the encoder EC1 or the encoder EC2.

At step S6, the motors drive controller 70 controls the motor M3 and the like to wind up the wire electrode 12 remaining downstream of the breakage position in the transfer path C, collect the wire electrode 12 into the collection unit, and thus remove the wire electrode 12. When the tip detection electrode 38 is in contact with the wire electrode 12 (step S7: YES) after the removal of the downstream wire electrode 12 (step S6), the motors drive controller 70 controls the motor M1 and the motor M2 so as to rewind the wire electrode 12 by a fixed length a (step S8). In this embodiment, the fixed length a of the wire electrode 12 is a length that corresponds to one pulse to be output from the encoder EC1 or the encoder EC2.

After removal of the wire electrode 12 downstream of the breakage position (Step S6), if the tip detection electrode 38 is not contacting the wire electrode 12 (Step S7: NO), the control of the wire electrical discharge machine 10 proceeds to step S13.

When the tip detection electrode 38 is in contact with the wire electrode 12 after the operation at step S8 (step S9: YES), the operations at steps S8 and S9 are repeated.

When the tip detection electrode 38 does not detect the contact of the wire electrode 12 at step S9 (step S9: NO), the position calculator 74 multiplies the fixed length a by the number of pulses obtained from the encoder EC1 or the encoder EC2 to calculate the rewound amount of the wire electrode 12 and determine the breakage position (step S10).

The adjustment unit 78 determines whether the breakage position calculated at step S10 belongs to the predetermined section (step 11). If the breakage position is within the predetermined section (step S11: YES), the adjustment unit 78 changes the machining conditions as described above (step S12). After the operation of step S12, the wire electrical discharge machine 10 executes the operation of step S13. If the breakage position is not within the predetermined section (step S11: NO), the wire electrical discharge machine 10 performs the operation of step S13.

At step S13, the wire feeding operation and the procedures associated therewith are executed. The wire feeding process is automatically performed by the wire electrical discharge machine 10, but may be manually performed by an operator if required.

After the process at step S13, the wire electrical discharge machine 10 executes a machining process (step S1).

When a wire breakage occurs during execution of a machining process under the predetermined machining conditions, the wire electrical discharge machine 10 according to the present embodiment performs adjustment of the machining conditions if the wire breakage position is present within a section (predetermined section) that includes the workpiece W and is an interval between the upper wire guide 52 and the lower wire guide 54, whereas the machine 10 will not perform any adjustment if the breakage position is not in the predetermined section. As a result, it is possible to suppress the recurrence of a wire breakage assumed to be caused by the machining conditions while preventing a decrease in efficiency due to an unnecessary adjustment of the machining conditions when a breakage not due to the machining conditions occurs.

Technical Ideas Obtained From Embodiment

The technical ideas that can be grasped from the above embodiment will be described below.

First Technical Idea

A wire electrical discharge machine (10) for performing electrical discharge machining on the workpiece (W) to be machined by applying voltage to the electrode gap formed between the wire electrode (12) and the workpiece (W) to generate electrical discharge at the electrode gap under the predetermined machining condition while conveying the wire electrode (12) along the transfer path (C), includes: the wire breakage detector (34) configured to detect the breakage of the wire electrode (12); the position calculator (74) configured to calculate the breakage position of the wire electrode (12) in the transfer path (C); and the adjustment unit (78) configured to adjust the machining condition when the breakage position is in the predetermined section of the transfer path (C).

Thereby, it is possible to prevent a decrease in efficiency due to an unnecessary adjustment of the machining conditions.

In the wire electrical discharge machine (10), the predetermined section may include the workpiece (W).

Thereby, it is possible to suppress the recurrence of a wire breakage caused by the machining conditions of the electrical discharge machining.

The wire electrical discharge machine (10) may further include: an upper wire guide unit (52) disposed upstream of the workpiece (W) in the transfer path (C) and configured to support the wire electrode (12); and a lower wire guide unit (54) disposed downstream of the workpiece (W) in the transfer path (C) and configured to support the wire electrode (12), and the predetermined section may be a section between the upper wire guide unit (52) and the lower wire guide unit (54). Thereby, it is possible to suppress the recurrence of the wire breakage caused by the machining conditions of the electrical discharge machining.

The wire electrical discharge machine (10) may further include: a transport device (14) configured to transport the wire electrode (12) along the transfer path (C) and rewind the upstream part of the wire electrode (12) in the transfer path (C), in the direction opposite to the transfer direction when the wire electrode (12) is broken; and a tip detector (38) disposed upstream of the workpiece (W) and configured to detect the tip of the wire electrode (12). The position calculator (74) may determine the breakage position of the wire electrode (12) by calculating the length of the upstream part of the wire electrode (12) that has been rewound from the start of rewinding of the upstream part of the wire electrode (12) by the transport device (14) to the time when the tip detector (38) detects the tip of the wire electrode (12). This configuration makes it possible to omit the calculation process for the case where a wire breakage occurs on the upstream side of the tip detector (38) in the transfer path (C), and also to accurately calculate the breakage position.

The machining conditions may include at least one of the voltage pulse pause time, the servo voltage, and the feed rate of the workpiece (W), and the adjustment unit (78) may be configured to perform, at least, one of the action of extending the voltage pulse pause time, the action of raising the servo voltage, and the action of lowering the feed rate of the workpiece (W), as compared to actions before the breakage occurs, when the breakage position is in the predetermined section. Thereby, it is possible to suppress the occurrence of a wire breakage again when performing a rework after breakage repair.

Second Technical Idea

A machining condition adjustment method for use in a wire electrical discharge machine (10) that performs electrical discharge machining on the workpiece (W) to be machined by applying voltage to the electrode gap formed between the wire electrode (12) and the workpiece (W) to generate electrical discharge at the electrode gap under predetermined machining conditions while conveying the wire electrode (12) along the transfer path (C), includes: the wire breakage detection step of detecting the breakage of the wire electrode (12); the position calculation step of calculating the breakage position of the wire electrode (12) in the transfer path (C); and the adjustment step of adjusting the machining conditions when the breakage position is in the predetermined section of the transfer path (C).

This configuration makes it possible to prevent a decrease in efficiency due to a unnecessary adjustment of the machining conditions.

In the machining condition adjustment method, the predetermined section may include the workpiece (W). Thereby, it is possible to suppress the recurrence of a wire breakage caused by the machining conditions of the electrical discharge machining.

The wire electrical discharge machine (10) may further include an upper wire guide unit (52) disposed upstream of the workpiece (W) in the transfer path (C) and configured to support the wire electrode (12), and a lower wire guide unit (54) disposed downstream of the workpiece (W) in the transfer path (C) and configured to support the wire electrode (12). In the machining condition adjustment method, the predetermined section may be a section between the upper wire guide unit (52) and the lower wire guide unit (54). Thereby, it is possible to suppress the recurrence of a wire breakage caused by the machining conditions of the electrical discharge machining.

The machining condition adjustment method may further includes: the transport step of transporting the wire electrode (12) along the transfer path (C) and rewinding the upstream part of the wire electrode (12) in the transfer path (C), in the direction opposite to the transfer direction when the wire electrode (12) is broken; and the tip detecting step of detecting the tip of the wire electrode (12) at a position upstream of the workpiece (W). The position calculation step may determine the breakage position of the wire electrode (12) by calculating the length of the upstream part of the wire electrode (12) that has been rewound from the start of rewinding of the upstream part of the wire electrode (12) at the transport step to the time when the tip detecting step detects the tip of the wire electrode (12). This configuration makes it possible to accurately calculate the wire breakage position.

In the machining condition adjustment method, the machining conditions may include at least one of the voltage pulse pause time, the servo voltage and the feed rate of the workpiece, and the adjustment step may perform, at least, one of the action of extending the voltage pulse pause time, the action of raising the servo voltage and the action of lowering the feed rate of the workpiece, as compared to actions before the breakage occurs, when the breakage position is in the predetermined section. Thereby, it is possible to suppress the occurrence of a wire breakage again when performing a rework after breakage repair.

The present invention is not limited to the above-described embodiment, and various modifications can be made without departing from the gist of the present invention.

What is claimed is:

1. A wire electrical discharge machine for performing electrical discharge machining on a workpiece to be machined by applying voltage to an electrode gap formed between a wire electrode and the workpiece to generate electrical discharge at the electrode gap under a predetermined machining condition while conveying the wire electrode along a transfer path, comprising:
    a wire breakage detector configured to detect a breakage of the wire electrode;
    a position calculator configured to calculate the breakage position of the wire electrode in the transfer path; and
    a controller programmed to adjust the machining condition when the breakage position is in a predetermined section of the transfer path.

2. The wire electrical discharge machine according to claim 1, wherein the predetermined section includes the workpiece.

3. The wire electrical discharge machine according to claim 1, further comprising:
    an upper wire guide unit disposed upstream of the workpiece in the transfer path and configured to support the wire electrode; and
    a lower wire guide unit disposed downstream of the workpiece in the transfer path and configured to support the wire electrode, wherein
    the predetermined section is a section between the upper wire guide unit and the lower wire guide unit.

4. The wire electrical discharge machine according to claim 1, further comprising:
    a transport system comprising guide rollers to transport the wire electrode along the transfer path and rewind an upstream part of the wire electrode in the transfer path, in the direction opposite to a transfer direction when the wire electrode is broken; and
    a tip detector disposed upstream of the workpiece and configured to detect a tip of the wire electrode, wherein the position calculator determines the breakage position of the wire electrode by calculating a length of the upstream part of wire electrode that has been rewound from the start of rewinding of the upstream part of the wire electrode by the transport device to a time when the tip detector detects the tip of the wire electrode.

5. The wire electrical discharge machine according to claim 1, wherein:
    the machining condition include at least one of a voltage pulse pause time, a servo voltage, and a feed rate of the workpiece; and
    wherein the controller is programmed to perform, at least, one of an action of extending the voltage pulse pause time, an action of raising the servo voltage, and an action of lowering the feed rate of the workpiece, as compared to actions before the breakage occurs, when the breakage position is in the predetermined section.

6. A machining condition adjustment method for use in a wire electrical discharge machine that performs electrical discharge machining on a workpiece to be machined by applying voltage to an electrode gap formed between a wire electrode and the workpiece to generate electrical discharge at the electrode gap under a predetermined machining condition while conveying the wire electrode along a transfer path, comprising:
    a wire breakage detection step of detecting a breakage of the wire electrode;
    a position calculation step of calculating the breakage position of the wire electrode in the transfer path; and
    an adjustment step of adjusting the machining condition when the breakage position is in a predetermined section of the transfer path.

7. The machining condition adjustment method according to claim 6, wherein the predetermined section includes the workpiece.

8. The machining condition adjustment method according to claim 6, wherein:
    the wire electrical discharge machine further comprises an upper wire guide unit disposed upstream of the workpiece in the transfer path and configured to support the wire electrode, and a lower wire guide unit disposed downstream of the workpiece in the transfer path and configured to support the wire electrode; and the predetermined section is a section between the upper wire guide unit and the lower wire guide unit.

9. The machining condition adjustment method according to claim 6, further comprising:

a transport step of transporting the wire electrode along the transfer path and rewinding an upstream part of the wire electrode in the transfer path, in the direction opposite to a transfer direction when the wire electrode is broken; and a tip detecting step of detecting a tip of the wire electrode at a position upstream of the workpiece, wherein the position calculation step determines the breakage position of the wire electrode by calculating a length of the upstream part of wire electrode that has been rewound from the start of rewinding of the upstream part of the wire electrode at the transport step to a time when the tip detecting step detects the tip of the wire electrode.

10. The machining condition adjustment method according to claim 6, wherein:

the machining condition include at least one of a voltage pulse pause time, a servo voltage, and a feed rate of the workpiece; and the adjustment step performs, at least, one of an action of extending the voltage pulse pause time, an action of raising the servo voltage, and an action of lowering the feed rate of the workpiece, as compared to actions before the breakage occurs, when the breakage position is in the predetermined section.

* * * * *